United States Patent [19]

Paitson et al.

[11] 4,049,078

[45] Sept. 20, 1977

[54] MARINE ACOUSTIC PULSE TRAIN SIGNAL GENERATOR

[75] Inventors: John Lloyd Paitson, Galveston; Clifford E. Anderson, Huntsville, both of Tex.

[73] Assignee: Western Geophysical Co. of America, Houston, Tex.

[21] Appl. No.: 647,549

[22] Filed: Jan. 8, 1976

Related U.S. Application Data

[63] Continuation-in-part of Ser. No. 460,867, April 15, 1974, abandoned.

[51] Int. Cl.[2] .......................................... G01V 1/04
[52] U.S. Cl. .................................. 181/120; 74/56; 60/542; 181/113; 181/119; 340/7 R
[58] Field of Search ............... 181/113, 119, 120, 103, 181/107; 74/56; 340/7 R, 12 R; 60/542

[56] References Cited

U.S. PATENT DOCUMENTS

| 1,310,574 | 7/1919 | Kollock et al. | 74/56 |
| 3,322,232 | 5/1967 | Chalmers et al. | 181/120 |
| 3,437,170 | 4/1969 | Brock et al. | 181/120 |
| 3,638,752 | 1/1972 | Wakefield | 181/120 |
| 3,750,097 | 7/1973 | Havlik et al. | 340/12 R |

Primary Examiner—S. C. Buczinski
Attorney, Agent, or Firm—William A. Knox

[57] ABSTRACT

An apparatus for generating a series of seismic acoustic pulses in a body of water. The series is characterized by having continuously-variable, non-repetitive time intervals between successive pulses during a continuous seismic recording. The preferred generator is an air gun comprising a variable-speed motor with a rotating cam for actuating a sleeve valve which alternately opens and closes exhaust ports in a high-pressure chamber. As the valve repeatedly opens, jets of high-pressure air are impulsively expelled into the surrounding water, thereby generating an underwater acoustic pulse train.

12 Claims, 8 Drawing Figures

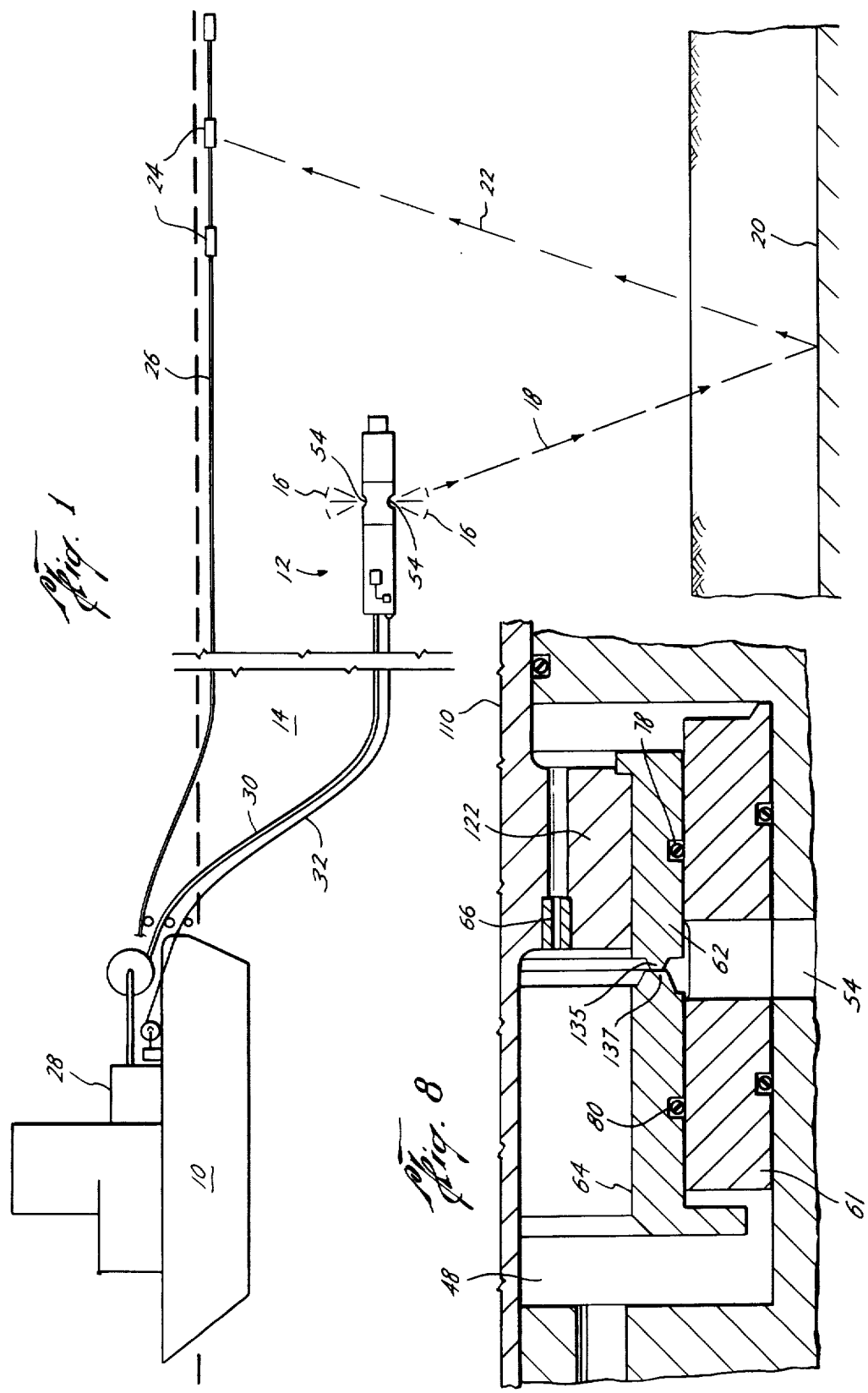

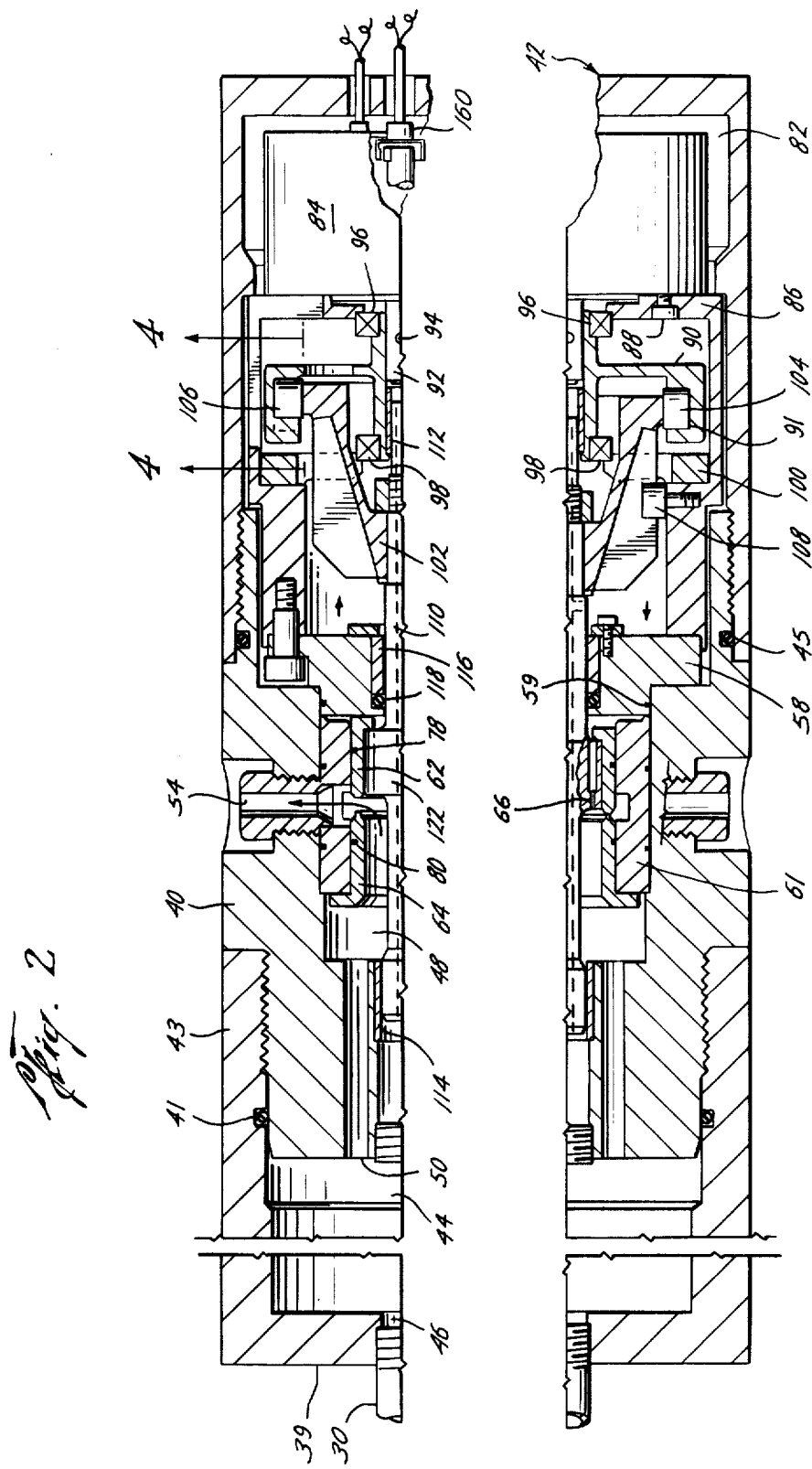

MARINE ACOUSTIC PULSE TRAIN SIGNAL GENERATOR

BACKGROUND OF THE INVENTION

1. Field of the Invention

This is a continuation-in-part of application Ser. No. 460,867 now abandoned, filed Apr. 15, 1974, assigned to the same assignee.

This invention relates in general to a marine apparatus which is stable under tow, for generating acoustic pulses in a body of water.

2. Description of Related Prior Art

In one method of land seismic exploration, described, for example in U.S. Pat. No. 2,688,124, a chirp-signal generated by a vibrator is injected into the ground. The chirp-signal, also referred to as a swept-frequency signal, is a unique wave train that is non-repetitive during a period that is at least twice as long as the maximum reflection travel time. The reflected signals, which are detected by geophones laid on the surface of the earth, are recorded on magnetic tape. Subsequently, the recorded reflected signals are cross-correlated with a replica of the original chirp-signal to produce a seismogram.

Because of their great commerical success on land, for many years workers in the seismic art have attempted to adapt land vibrators for use at sea, but serious problems were encountered. The marine vibrators were hydraulically or pneumatically operated. They generally took the form of large bellows or vibrating diaphragms many feet in diameter. A typical such device is disclosed in U.S. Pat. No. 3,394,775. Because marine vibrators were large and bulky, they were at first installed in a well formed in the hull of a vessel. The constant vibration from the vibrator caused fatigue-cracks throughout the ship's structure. Later, the vibrators were trailed in the water alongside the ship from booms, as described in U.S. Pat. No. 3,452,327. The heavy, unwieldy vibrators, with their multiplicity of hydraulic and/or pneumatic control hoses, required complex handling gear on the support vessel. Furthermore, since they were designed primarily for seismic efficiency, the vibrators were hydrodynamically unstable, trailing erratically when under tow, and requiring a large towing force.

The seismic chirp-signal generated by the vibrator discussed above is a continuous oscillatory wave train of 5 to 15 seconds duration. The initial and final frequencies of the signal lie within the useful seismic spectrum, usually within the range of 3 to 100 Hz. A typical chirp-signal, for example, might start at 10 Hz and terminate at 40 Hz. Many other frequency ranges are in common use.

It is possible to generate an analogous signal in the form of a discrete pulse train. The interval between successive pulses may be likened to the period of a wavelet, the period being the reciprocal of the frequency. In a marine environment, a discrete pulse train can be generated by a gas or air gun of any type well known to the art. One such method is described in an article beginning on page 673 of the August, 1973 issue of *Geophysics*. As pointed out by the author, state-of-the-art air or gas guns are limited to equivalent frequencies of up to 7 Hz. Such a restricted, relatively low frequency range for the seismic spectrum is unsuitable for general use with accepted chirp-signal correlation techniques.

Typical air guns used in seismic exploration, are described in U.S. Pat. Nos. 3,638,752, 3,249,177, and 3,276,534. All of these air guns are "one shot" sound sources. That is, for each recording cycle of 5 to 15 seconds, the gun is fired but once.

Other pulse-generating devices, such as a pulsed sonar or a marine sparker, are available. However, pulsed-sonar devices do not have sufficient output power to penetrate the earth to a depth that is commercially useful in oil exploration. Because of practical physical limitations of the input power versus capacitor charging rate, the firing repetition rate or equivalent frequency of a sparker is, at best, only a few Hertz. A typical range is 1 to 4 Hz.

SUMMARY OF THE INVENTION

It is a purpose of this invention to provide an apparatus for generating a continuous acoustic pulse train of 5 to 15 seconds duration, in a body of water during a single seismic recording cycle. During the recording cycle, the frequency or repetition rate of the pulses making up the pulse train is continuously variable over a desired range. By way of example but in no way thereto restricted, the frequency may be varied from 10 to at least 40 Hertz (cycles per second) during a 6 second cycle.

One aspect of the pulse train generator of this invention, is an air gun which includes a chamber containing a volume of air under pressure. The chamber is provided with a number of exhaust ports that are normally closed by a sliding spool valve. A rotating cam mechanically coupled to the spool valve causes the spool valve to slide repeatedly from the normally closed position to a momentary open position during a sweep cycle of several seconds. The cam is driven by a variable-speed motor to cause the exhaust ports to open and close at a selected rate. At each port opening, a jet of high-pressure air is ejected into the water, thereby producing an acoustic impulse. A plurality of such pulses, generated at varying time intervals, form the desired sequence of seismic pulses.

In a feature of this invention, the spool valve has upper and lower faces, both of which faces are exposed to the volume of air under pressure. The portions of the areas of the two faces that are exposed to the pressurized air are equal so that the forces on each face, when the valve is closed, are balanced.

In accordance with an important aspect of this invention, the exhaust ports open substantially instantaneously, but only during a small portion of a cam rotation cycle and close while the chamber pressure still remains substantially greater than the ambient water pressure, thereby permitting repeated cycling without waiting for the chamber pressure to build back up.

Also, by arranging the towed parts around a common longitudinal axis, a generator with optimum stable towing characteristics is obtained.

BRIEF DESCRIPTION OF THE DRAWINGS

FIG. 1 is a schematic repesentation of the manner of using the invention for marine seismic exploration;

FIGS. 2 and 3 are half-sectional views of a preferred embodiment of the pulse-train generator of the invention with the exhaust valve in its open and closed positions, respectively;

FIG. 8 is an enlarged, partial sectional view of the spool valve.

DETAILED DESCRIPTION OF THE INVENTION

Figure 4:
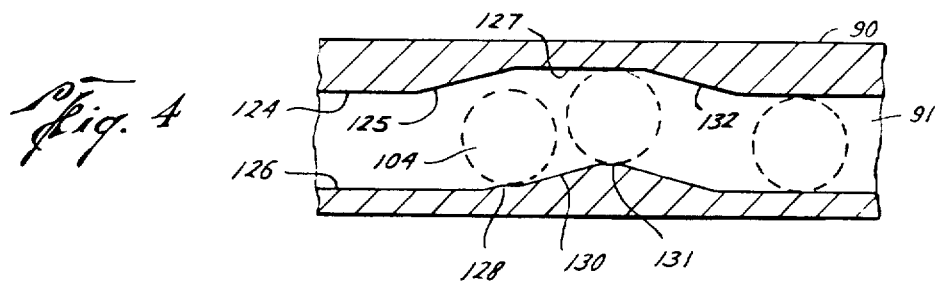
FIG. 4 is a diagram of the developed geometry of the rotary cam in the generator.
Figure 5:
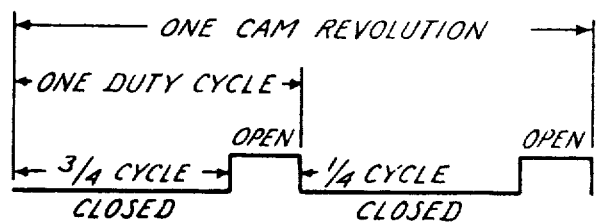
FIG. 5 is a timing diagram of the cam's duty cycle.

Referring to FIG. 1, vessel 10 tows a pulse-train generator 12 through a body of water 14. At desired locations, the generator will generate a pulse-train produced by a series of high-pressure air jets 16 released into the water. The pulse-train travels along raypath 18, is reflected from subsurface formation 20, and returns to the water surface along raypath 22. The reflected chirp-signal is detected by hydrophones 24 within a very long streamer cable 26, also towed by vessel 10.

Air compressor 28 on vessel 10 feeds generator 12 through a high-pressure air hose 30. Electrical cable 32 connects the generator to a digital or analog programmer 29 on the vessel which programs the generator to emit air jets through exhaust ports 54 at consecutively non-uniform time intervals.

The presently preferred embodiment of generator 12 (FIGS. 2, 3, and 8) comprises a close-ended, elongated cylinder 43 threading with the lower end of a valve body member 40 and sealed therefrom by O-ring 41. The elongated cylindrical shape permits the gun to be hydrodynamically stable under tow in the water.

Cylinder 43 defines a large supply chamber 44 adapted to contain a volume (say 500 cubic inches) of a high-pressure gas, preferably air. The preferred maximum air pressure is between 1000 and 10,000 psi. Pressure hose 30 connects with inlet port 46 in bottom wall 39 of chamber 44.

Valve body 40 defines a valve chamber 48 in communication with chamber 44 via inlet ports 50. A plurality of angularly displaced exhaust ports 54 are provided around the perimeter of body 40. Although two are shown, six such ports are preferred. The upper end of body 40 is closed by a coverplate 58 and sealed by an O-ring 59.

The valve body 40 is provided (FIGS. 2 and 8) with a valve liner 61, a sliding, reciprocating spool seat 62, a cooperating moveable or floating body seat 64, and metering orifice 66. O-rings 78 and 80 seal spool seat 62 and body seat 64, respectively, against the inner cylindrical wall of valve liner 61. When spool seat 62 engages body seat 64, exhaust ports 54 are closed.

A cylindrical end cap 42 (FIGS. 2 and 3) is threadably connected to body 40 and defines therewith a cam chamber 82 which is sealed by O-ring 45. A drive motor 84 is supported on a mounting bracket 86 and secured by bolts 88. A rotating cam 90 is secured to the motor's shaft 92 by pin 94. Cam 90 is centered by and rotatably mounted on upper and lower bearings 96 and 98. Upper bearing 96 is supported by motor bracket 86, and lower bearing 98 is secured to support bracket 100.

A cam follower 102 is actuated by cam 90 through rollers 104 and 106. Lateral stabilizer bearing 108 restrains cam follower 102 from rotating but not from reciprocating movement. Cam follower 102 is secured to shaft 110 whose upper end extends through sleeve bearing 112 mounted in the center of cam 90. The bottom end of shaft 110 is centered by sleeve bearing 114. Center plate 58 also has a bearing 116 and an O-ring 118 wiping against shaft 110 to seal off cam chamber 82 from valve chamber 48. Shaft 110 has a radially-extending shoulder 122 for supporting thereon spool seat 62. As shaft 110 moves longitudinally up and down with cam follower 102, spool seat 62 moves to alternately engage and disengage its mating body seat 64, thereby closing and opening exhaust ports 54.

The diameter of shaft 110 and the inside diameter of valve liner 61 are exactly dimensioned so that the cross-sectional area of valve liner 61 minus the cross-sectional area of shaft 110 exactly equals the cross-sectional area defined within sealing lips 135 and 137. Thus there exists no net closing or opening force between spool seat 62 and body seat 64 in closed position, resulting from internal pressures within the valve body.

Referring now to FIGS. 2–4, cam slot 91 has upper and lower cam surfaces 124 and 126. Lower surface 126 has a step 128 followed by a cam-rise 130. In the preferred embodiment, step 128 has an angular width of 7.5° and is 0.015° high. Cam-rise 130 has a slope of approximately 15°, an angular width of 22.5°, and a height of 0.184 inch. Cam-fall 132 has a slope near 15° and an angular width of 22.5°. Upper surface 124 has an upward sloping wall 125 for an angular width of about 23°, followed by a horizontal wall 127 for about 22.5°.

Cam slot 91 has two such cam-rises 128, 130, and cam-falls 132, respectively spaced 180° apart to correspond with the two cam-follower rollers 104 and 106. As cam 90 rotates, cam follower 102 quickly rises on step 128, moves almost instantaneously to a fully open exhaust port position, and, after passage over top 131, moves down on cam-fall 132. Every revolution of cam 90 produces two cam-follower duty cycles.

Motor 84 is a variable-speed stepping motor, such as SLO-SYN stepping Motor Model M112. Precisely programmed by digital programmer 29 (such as SLO-SYN HTR 105 RT translator) the motor's speed can be varied accurately over a wide range. In one preferred embodiment, the speed is varied from 0 to 1200 rpm, and the duty-cycle frequency is varied from 0 to 40 cycles per second. Motor 84 may be of the variable speed type with which the control system would be somewhat different, but the end result will be identical. Thus, by use of programmer 29 in conjunction with mechanisms herein described, pulse generator 12 is an air gun having a programmable firing rate during its duty cycle.

In opertion, at the beginning of the closing cycle, cam surface 132 forces cam follower bearings, shaft 110 and spool seat 62 toward body seat 64 and then into contacting engagement with body seat 64, thereby restricting the flow of compressed air through the exhaust ports 54. Under the opening action of cam lifting surface 128, the cam follower forces the seats apart and provides a path for the exhaust air through openings 54. As soon as cam 90 turns enough, its surface 132 will start pushing the cam follower bearings, shaft 110 and spool seat 62 toward the body seat 64, thus beginning the closing cycle all over again.

It is desirable that seat 62 be closed at all times particularly between duty cycles, except when it is forcefully opened, to prevent appreciable escape of air to the outside. To that end, a cam position sensing switch 160 is connected to the upper end of motor shaft 92. Switch 160 is electrically connected to programmer 29 through wires contained within control cable 32. At the end of each group of operating cycles, the programmer will force motor 84 to continue rotation for a fraction of a turn after cam 90 closes spool sleeve 62 before stopping at the end of a duty cycle.

When generator 12 is used as a seismic acoustic chirp-signal generator, it will produce, although it is not restricted to, a band of frequencies ranging between 10 and 40 Hertz. In a chirp-signal, the frequency pattern must not be repetitive during the sweep or seismic recording cycle. A chirp-signal may be produced by the generator of this invention by emitting a series of air jets with continuously changing time intervals therebetween. The time interval between two consecutive air jets is the period, which is also the reciprocal of the frequency. In operation therefore, generator 12 (air gun) generates a plurality of acoustic pulses in rapid succession at a programable pulse repetition rate. The rapidity of pulse generation depends upon the desired frequency and may very from five to as many as 40 or 50 or more pulses per second. The train of pulses is delivered into the water during one sweep cycle, the time duration of which is encompassed within a single seismic recording cycle of five to fifteen or more seconds.

The speed of motor 84 controls the interval between consecutive duty cycles of valve seat 62 and hence the acoustic pulse rate. Since the chirp-signal must be non-repetitive throughout its length, at any given time motor-shaft 92 must either accelerate or decelerate, else the acoustic pulse rate or signal frequency pattern would remain constant and repeat itself. Thus, the length of the sweep cycle is dependent upon the rate of change of the motor's speed.

The chirp-signal begins at some specified starting frequency. For the first few milliseconds of the sweep cycle, the motor is accelerated rapidly to reach this desired starting frequency within the first cam rotation cycle. Thereafter, the acceleration is reduced to a rate compatible with the desired sweep cycle length.

Figure 6:
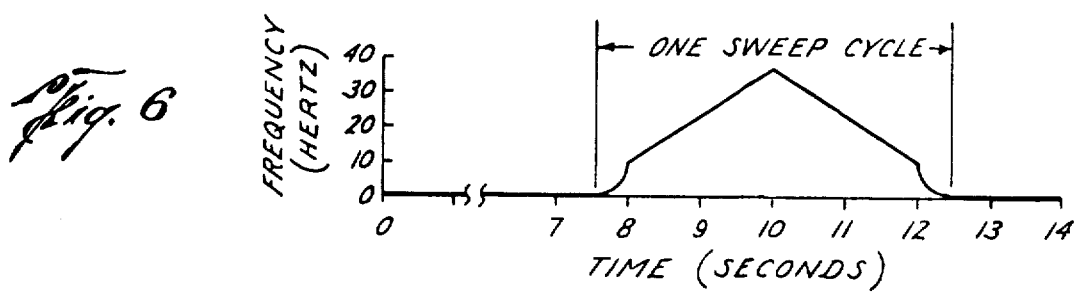
FIG. 6 is a graph of the change in frequency of the pulse-train with respect to time during one sweep cycle.

FIG. 6 is a graph showing the change in frequency versus time. Before the beginning of a sweep cycle, there is a dead period of several seconds. At the start of the sweep cycle, the motor is rapidly accelerated to a rotation rate of, say, 10 Hz or 300 rpm. Thereafter, the acceleration rate is reduced so that the peak motor speed will be reached in half of the sweep cycle period, at which point the motor begins to decelerate. The motor is accelerated to provide a peak duty cycle frequency of 40Hz or 1200 rpm within 2 seconds. The motor is then decelerated during the next 2 seconds.

While the highest frequency is shown to occur at the midpoint of the sweep cycle, other sweep patterns can be programmed so that the highest frequency is reached substantially at the end of the sweep cycle, at which time the motor is abruptly stopped. The length of each sweep cycle and the intervals therebetween can be altered at will by the digital programmer 29.

Figure 7:
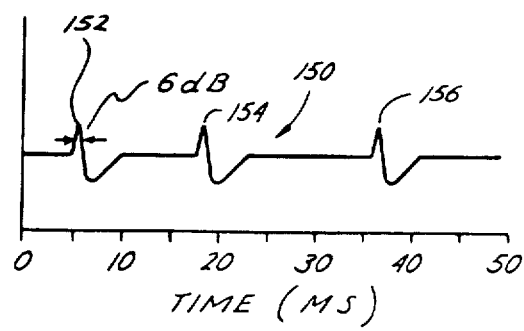
FIG. 7 is a typical underwater pulse pressure signature produced by the generator of this invention.

When a jet of high pressure air is expelled into the water, a powerful acoustic pulse is generated. In FIG. 7 is shown the detected pressure signature 150, consisting of pulses 152, 154, 156. It is plotted as a function of amplitude versus time. Each pulse is characterized by the amplitude of its first peak, and the pulse width at the 6 dB (50%) point of the pulse. These parameters are a function of the pulse's rise time. In accordance with well-known mathematical principles, the power spectrum of a pulse can be computed from its Fourier transform. In general, the slower the pulse rise time, the lower the dominant frequency exhibited by the power-spectral plot.

The pulse rise depends upon many parameters, as has been much discussed in standard tests on underwater explosions. But assuming all other parameters to be constant, the pulse rise is a function of the momentum MV of the escaping air, where M is the mass of the air and V is its escape velocity. Accordingly, by varying the release rate of the air, and hence the mass M, the rise time of the pulse pressure-signature can be controlled within certain limits.

The air release rate from generator 12 can be controlled by varying the rotation rate of rotary cam 90. Thus the generator has means to optimize the gas release rate to tune the dominant frequency of any given pulse to become inversely proportional to the period between two adjacent pulses, and to thereby reinforce the instantaneous signal frequency in each chirp-signal generated.

The sequence of impulses illustrated in FIG. 7 is intended to represent only those impulses which are produced directly by the release of air from the source. In actual practice, the released masses of air will each tend to generate a sequence of bubble pulses such as are described in U.S. Pat. No. 3,592,286. Thus the pressure-signature will, in actuality, be more complex than the one illustrated herein. Processing of the resulting data may nevertheless proceed by correlation or by using an inverse operator for the entire pulse train as described in said patent.

Although this invention has been described with particular reference to a swept-frequency signal, wherein the frequency is smoothly varied from its lowest to its highest value, this invention also may be used to provide a pseudo-random acoustic wave train.

Changes may be made in the above described embodiment or in the arrangement of the elements therein without departing from the spirit or the scope of this invention as defined in the following claims.

What is claimed is:

1. An air gun for generating a train of discrete acoustic pulses in a body of water at a desired pulse repetition rate during a single recording cycle of predetermined length comprising:
   a housing defining a supply chamber for receiving a volume of high pressure air, the housing including an inlet and at least one exhaust port fluidly communicating, in use, with said body of water;
   sliding valve means mounted in said housing between said supply chamber and said exhaust port;
   reciprocatingly mounted, rigid linkage means fixedly secured to said sliding valve means;
   control means for continuously varying the repetition rate of said pulses from 5 to at least 40 Hertz, thereby to define a seismic chirp signal; and
   drive means mechanically connected to said linkage means and cooperating with said control means for opening and closing said valve means, thereby periodically emitting a high pressure air jet through said exhaust port into said body of water.

2. The air gun of claim 1 wherein said control means is a programmable rotary stepping motor having a drive shaft.

3. The air gun of claim 2 wherein said drive means is a rotary cam secured to the drive shaft of said stepping motor for imparting reciprocating motion to said sliding valve means through said linkage means.

4. The air gun of claim 1 wherein said control means is a rotary variable-speed electric motor.

5. The air gun of claim 1 wherein said chamber, said valve means, said linkage means, said drive means, and said control means are concentrically mounted along a common longitudinal axis.

6. The air gun of claim 2 and including a remotely located digital programming means for energizing said stepping motor varying the rotational speed thereof in accordance with a preselected program.

7. The air gun as defined in claim 6 wherein:
said control means includes a position indicating means for causing said drive means to stop at the end of a duty cycle only when said sliding valve is closed.

8. The air gun of claim 3 wherein said cam has closing surfaces for closing said sliding valve and maintaining said valve in a closed position between duty cycles.

9. The air gun as defined in claim 7 wherein said valve means includes a sliding spool member and a cooperating seat.

10. A pulse train generator having a programmable firing rate during a duty cycle of predetermined duration for generating an acoustic chirp signal in a body of water, comprising:
an elongated cylindrical housing defining a supply chamber to receive high-pressure air, the housing having at least one exhaust port periodically fluidly communicating, in use, between said body of water and supply chamber;
valve means including a sliding spool member and a cooperating seat mounted in said housing between said supply chamber and said exhaust port said sliding spool member having upper and lower faces, said lower face including a lip for sealingly contacting said cooperating seat when said valve means is closed, the portion of the areas of said upper and lower faces of said sliding spool valve that are exposed to high pressure air when said valve means is closed being equal to impart balanced forces upon said faces;
valve drive means having a reciprocatingly mounted linkage member fixedly connected to said sliding spool member; and
programmable control means for energizing and controlling said drive means, said drive means moving said linkage member to open and close said valve means for periodically emitting an air jet through said exhaust port.

11. The pulse train generator of claim 10 and including a remotely located source of compressed air connected to said inlet for maintaining the pressure in said supply chamber at a desired pressure above ambient.

12. An air gun for generating a train of discrete acoustic pulses in a body of water during a recording cycle comprising:
a housing means for containing a volume of high-pressure air and having at least one exhaust port;
valve means, slidingly mounted in said housing means, for periodically releasing a portion of said high-pressure air into the water through said exhaust port;
programmable control means interconnected with said valve means, for reciprocatingly actuating said valve means at desired time intervals; and
a remote source of compressed air for maintaining the volume of air in said housing at a desired pressure above ambient during a recording cycle.

* * * * *